Sept. 3, 1963 — W. ROTTIG — 3,102,300
METHOD AND APPARATUS FOR PRODUCTION
OF POROUS BODIES FROM PLASTICS
Filed Jan. 24, 1961

INVENTOR.
WALTER ROTTIG
BY Mestern & Mestern 3,102,300
METHOD AND APPARATUS FOR PRODUCTION OF POROUS BODIES FROM PLASTICS
Walter Rottig, Oberhausen-Sterkrade-Nord, Germany, assignor to Ruhrchemie Aktiengesellschaft, Oberhausen-Holten, Germany
Filed Jan. 24, 1961, Ser. No. 84,500
Claims priority, application Germany Jan. 29, 1960
7 Claims. (Cl. 18—5)

The invention relates to the manufacture of porous bodies from plastics and, more particularly, to the production of such porous bodies by successive steps of sintering of the plastic material.

In the production of porous bodies from plastics, e.g., from polymers of low-molecular aliphatic olefines like polyethylene, it had been attempted to obtain the necessary porosity by admixing organic compounds which decompose under evolution of gas at given temperatures, effecting, in this manner, a loosening of the compact structure. The decrease in bulk density thus attained generally had been about one-half of, and occasionally less than, the specific gravity of the starting material.

The following procedure has been established to produce porous plastics having a higher degree of porosity and correspondingly low bulk density than heretofore obtained. This is accomplished by dropping powdered polymers, in the form of fine dust, at elevated temperatures loosely on a base plate, sintering the dust particles by the action of uniform heat, again dropping resin dust on the sintered layer and sintering this, and repeating the process until sufficient layers have been sintered together that the desired thickness is obtained.

Starting materials for the method according to the invention are particularly the polymers of low-molecular aliphatic olefines having 2 to 6 C-atoms, especially of ethylene and propylene and/or co-polymers of these, and/or mechanical mixtures of the same, as produced according to the different large-scale processes, especially by polymerization at pressures up to approximately 100 kg./cm.$^2$ and at temperatures below 100° C. in the presence of catalysts consisting of mixtures of organo-metallic compounds of the 1., 2. and 3. groups of Mendeleev's Periodic Table with compounds of metals of the 4th to 6th sub-groups of that Periodic Table. The products, in the different polymerization processes, are obtained in more or less finely powdered form. For the method according to the invention it is advantageous if the particle size of about $\frac{1}{10}$ mm. is not exceeded. Especially favorable structures are attained if the grain size of the powder is less than $\frac{1}{20}$ to about $\frac{1}{1000}$ mm. The bulk weights of the powdery polymers are generally between 200 g. and 350 g./liter.

For the method according to the invention and for the porous bodies made therefrom, respectively, it is important that the polymers have as low an ash content as possible. Therefore, ashes should be removed from the charged powder before starting the process according to the invention. The applicable methods are well known.

Of decisive importance for the process according to the invention is the temperature at which the powdery material is combined by thermal action. This temperature depends upon the type of starting material, e.g., polyethylene, polypropylene, co-polymers, mechanical mixtures, etc. Furthermore, the molecular weight, the melting point or melting range and the crystallinity of the starting material are essential. The temperature determines the speed with which the powdering on the base takes place, e.g., the dosing in mg./cm.$^2$/sec. Both factors define decisively the density or the porosity of the finished product.

To carry out the process according to the invention, e.g., a plate made of stainless steel or of aluminum or other suitable materials is employed, which can be provided, if necessary, with a protective covering, made e.g., of a foil, expediently of the same material as the starting powder. The plate is heated, for example by radiant heaters, arranged above it, at temperatures between about 50 and 300° C., preferably between about 100 and 200° C. To obtain a porous material of uniform structure, it is particularly important that at all spots of the base a uniform or, more correctly, the same temperature prevails. It is of particular advantage if the temperature difference measured at the same distance from the plate, i.e., where the build-up of the individual layers is carried out by sintering, are less than 2° C., and preferably less than 1° C. With a suitable device, for example a gauze bag containing the starting material, laid above the heated base plate, a uniform powder layer can be distributed on the heated plate by tapping the bag. The powder layer more or less firmly sets on account of its small height and of the temperature prevailing on the bottom of the plate. By further supplying layers of powder, a systematic build-up of the porous materials is attained. The temperature should carefully be kept constant at all times, to get a uniform structure of the porous material. This necessitates that, on account of the increase of the thickness of a layer, either by lowering of the bottom plate the distance of the uppermost layer from the heat source will be kept constant, or conversely, by lifting of the heat source, in regular intervals or continuously, this distance be kept constant. Both these actions can also be combined. In this manner, porous bodies of any height desired can be produced.

The base plate can be covered in such a manner that the plate itself is rotated and the starting material uniformly is applied thereon from a powdering device suspended above it, which, e.g., can be shaped in the form of a segment. It also is possible to rotate the powdering device above the plate which is at rest, or else, both can rotate. This latter method is to be recommended especially, when round porous bodies are to be produced. For the production of plates, for example, square plates, a device is used which moves the plate back and forth below a powdering device, which corresponds to the longitudinal axis. It is expedient to apply the powder only when the plate moves in one direction, and stops powdering in the opposite direction, as otherwise the outer edges will be supplied too little material and no uniform height of the plate can be obtained. It also is possible to move the powdering device back and forth above the stationary plate, applying the powder solely in one direction. Also, a combination of both modes of operation can be practiced, especially for the fabrication of large bodies.

As mentioned above, the sintering temperature is very important. For polyethylene of a molecular weight between about 20,000 and 100,000, a temperature between about 130 and 150° C. is especially expedient. It is necessary that these temperatures are measured in the state of equilibrium before beginning to charge the material. The real temperatures of the material in the form of dust before and in the state of sintering can deviate more or less, e.g., dependent on kind and quantity of starting material, thermal conductivity of material, particle size, etc.

To obtain uniform quality of the porous substance, a powder of as uniform size of the individual particles as possible is required, and it is of advantage to sort the starting material before use. This sorting can be done, e.g., by sifting, screening, air separation, and by other known processes. An advantageous quality of the starting material is attained if the particle size of the powder differs by not more than two powers, and preferably only one decimal power.

The application of vacuum or pressure in the method according to the invention is feasible in certain cases. This relates to the gas phase applied by working. A gas inclusion in the porous material at excess pressure is desirable since the porosity can be influenced thereby. Furthermore the thermal conductivity of the gas in relation to the pressure can be of importance. Excess pressures above 25 kg./cm.$^2$ are applicable, but generally 5 kg./cm.$^2$ will not be exceeded, and the most expedient working method is at normal atmospheric pressure. The limit of diminished pressure is at about 100 mm. Hg.

The process according to the invention not only allows the build-up of porous materials which consist of uniform polymers, but also different materials can be combined, e.g., one upon another. Of course, the temperatures and powdering conditions must be adjusted according to the peculiarity of the products used. Furthermore, certain quantities of inhibitor of the kind and quantity demanded by the polymer can be added to the starting products to avoid oxidation during the build-up of the porous materails at the elevated temperatures.

Furthermore, it is expedient to work in an inert atmosphere, e.g., in carbon dioxide or nitrogen, on occasion also in hydrogen. The possibility of admittance of oxygen is largely excluded thereby.

Though it is not necessary to use, for the production of porous materials, propellants which split off gas, in special cases it has been found expedient to use an admixture of these compounds for attaining an additional loosening of the structure of the pores.

The process according to the invention renders feasible the fabrication of porous materials by using the customary starting polymers which have a bulk density between 800 and about 200, preferably 600–250. The fabrication of porous products of still considerably less specific gravity and nevertheless sufficient solidity is also possible, when polymers are used as starting materials having particularly low bulk density. As mentioned, for example, polymers of ethylene, propylene etc., produced in the customary manner, also the mixtures of these or co-polymers normally having bulk densities between about 200 and 300 g./liter, can be made into polymers, by observing certain precautions, of a bulk density of one decimal power lower, e.g., between about 20 and 30 g./liter. The production of starting products with bulk densities which lie between these values and those of normal polymers, of course, is possible by corresponding measures. According to the process herein described, porous bodies can be produced having a continuous sequence of bulk densities.

By application of starting materials of low bulk density, porous materials are obtained by the measures according to the invention which have a bulk density between about 25 and 100 g./liter. The method is the same as described above.

By application of powders of different bulk densities, or of different molecular weights, or by using different polymers, e.g., polyethylene and polypropylene, porous materials with different qualities are produced. The powders can be mixed together, or more frequently, they are applied one after another, e.g., in layers one upon another. For the technical range of application there is an unlimited number of variations.

The porous materials according to the invention can be fabricated in the conventional manner, for example, by cutting, planing etc., further by welding, sintering and cementing together.

The invention now will be further illustrated by the following examples. However, it should be understood that these are given merely by way of explanation, not of limitation, and that numerous changes may be made in the details without departing from the spirit and the scope of the invention as hereinafter claimed.

*Example 1*

A circular metal plate of a diameter of 20 cm. was heated by a heat radiator, arranged at the side, to a temperature of 130° C. (measured in a resting condition). The plate turned around its own axis at 10–20 r.p.m. Out of a gauze bag containing powdered polyethylene (molecular weight 100,000) and installed in a vertical distance of 10 cm., polyethylene was dusted upon the plate by tapping the bag. The surface of the plate was kept at a constant temperature. By a lifting device, the bag could be lifted at a distance which corresponded to the height of the gradually built-up layer of polyethylene, so that the distance of dusting device to surface of the polyethylene plate remained constant. After one hour of powdering time, a porous plate of about 15–120 mm. height was formed. Slight unevenness on the surface was removed by grinding.

A comparative test was carried out with the difference that the polyethylene to be dusted on, was treated for 5 minutes in a mechanical pulverizer (Starmix). On account of this pulverization, the plate thus obtained had higher strength compared with the one made as described above and had a bulk density which was about 10% higher (0.60 against 0.55).

*Example 2*

A further experiment was carried out according to Example 1 by employing propylene, which had been produced with the aid of so-called Ziegler-Natta-catalysts, as described in the literature. The polypropylene had a molecular weight of 150,000. The plate this time was heated at 170° C. This temperature was measured in a resting condition and decreased about 15° C. during the operation. The distance between the dusting device and the surface of the original plate of polypropylene formed (distance 13 cm.) was kept constant by keeping the dusting device fixed, whereas the rotating plate moved downward corresponding to the height of the built-up polypropylene plate. After one and a half hours powdering time a porous plate of approximately 20 mm. height had formed.

*Example 3*

Above a ground plate of stainless steel ($\phi$ 25 cm.) a circular segment was arranged (angle on the central point of the circle about 40°) in a vertical distance of 15 cm. At the side, the plate was protected against heat radiation by an asbestos cylinder which nearly touched the plate. Upward heat radiation was prevented by asbestos board which had the same distance as the segment (15 cm). The segment itself consisted of a box having a sieve bottom (approximately 1–1.5 mm. mesh, stainless steel wire) containing powdered and sifted polyethylene. On the box, a knocker was disposed which, when actuated, caused the polyethylene to spray evenly through the sieve bottom onto the plate. The polyethylene had been produced by using Ziegler-catalysts and had a molecular weight of approximately 500,000, measured viscosimetrically, as all molecular weight measurements named in this specification had been carried out, and contained 0.2 percent by weight of an inhibitor, namely mercaptobenzimidazol.

The bottom of the plate was heated by radiators, which were arranged in the slits of the asbestos cylinders, at about 200° C., measured in resting condition.

The plate then rotated at 12 r.p.m. The knocker at the segment box was put into operation by means of a cam, and the polyethylene was dusted uniformly on the support. By lowering the bottom plate, care was taken that the distance of the polyethylene plate form the sieve bottom of the segment always remained constant.

After a dusting time of 1.5 hours, a porous plate of about 15 mm. height had been obtained.

During the dusting a weak stream of nitrogen was introduced to prevent the entrance of air. Carbon dioxide also was found suitable instead of nitrogen.

The accompanying drawing shows a preferred embodiment of the device used in the manufacture of the porous bodies according to the invention.

Figure 1:
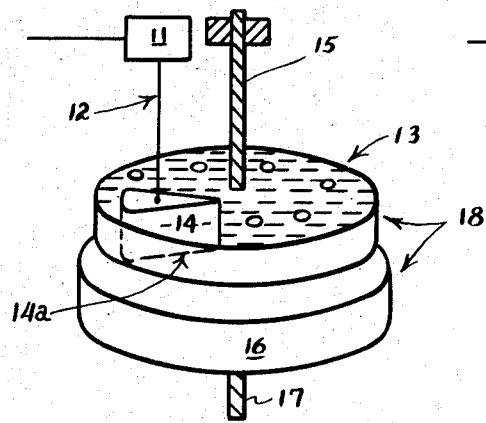
FIG. 1 is a perspective view of the device in extended position, i.e., ready for application of a second layer.
Figure 2:
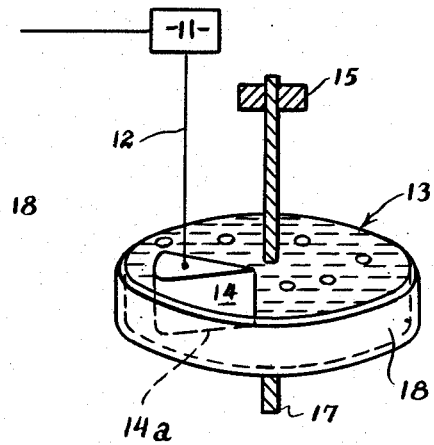
FIG. 2 is a perspective view of the same device prior to application of the first layer.

Referring to these drawings, the vibrator 11 is connected to the vibrating rod 12. The latter is inserted in the segment-shaped storage container 14 holding the powdered polyolefins. The container 14 protrudes through the heating plate 13 and is provided with a perforated bottom 14a. The heating plate rests at a given distance above the rotating plate 16, depending on the thickness of the layer to be produced.

Figure 3:
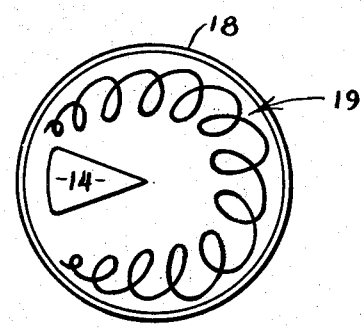
FIG. 3 is a plan view of the heating plate showing the heating coil.

This distance is determined by moving plate 16 along its axle 15 which is threaded so that plate 16 can be moved upward or downward by rotating it around axle 15. The rotating plate 16 is rigidly connected to the rotating axle 17. An insulating frame 18 prevents lateral heat radiation to the outside. The heating plate 13 is provided with a heating coil, as shown in FIG. 3.

I claim as my invention:

1. A process for the manufacture of porous bodies from plastics, which comprises dropping powdered polymers having a grain size of less than $\frac{1}{20}$ to substantially $\frac{1}{1000}$ mm. and a bulk weight of 200 to 350 grams per liter on a heated base plate, heat also being supplied by a heat source disposed above said plate, sintering the powder on said base plate at a temperature ranging from 50 to 300° C. while keeping said temperature constant, dropping a further layer of powder on the polymer plate formed while maintaining said constant temperature by keeping the distance of the upper surface of the powder from the heat source constant, and repeating powdering and sintering until the desired height has been attained, the porous body thus formed having a bulk density of 200 to 800 grams per liter.

2. A process for the manufacture of porous bodies from plastics, which comprises dropping powdered polymers having a grain size of less than $\frac{1}{20}$ to substantially $\frac{1}{1000}$ mm. and a bulk weight of 200 to 350 grams per liter on a heated base plate, heat also being supplied by a heat source disposed above said plate, sintering the powder on said base plate at a temperature ranging from 50 to 300° C. and being kept constant within 2° C., dropping a further layer of powder on the polymer plate formed while maintaining said constant temperature by keeping the distance of the upper surface of the powder from the heat source constant, and repeating powdering and sintering until the desired height has been attained, the porous body thus formed having a bulk density of 200 to 800 grams per liter.

3. The process as defined in claim 1, wherein said polymers are selected from the group consisting of aliphatic olefines having 2 to 6 carbon atoms, copolymers thereof and mechanical mixtures thereof.

4. The process as defined in claim 3, wherein said polymer is a polyethylene having a molecular weight of 20,000 to 100,000, measured viscosimetrically, said polymer being sintered at a temperature of 130 to 150° C.

5. A device for the production of porous bodies from plastics made from polymers, which comprises, in combination, a horizontally rotatable base plate; heating means to keep the temperatures at all points on said plate at 50 to 300° C., and within less than 2° C. variation; a container for said polymers, said container having a sieve bottom and being disposed movably above said base plate; a tapping device disposed on said container to distribute said polymers evenly on said base plate; means for moving said container to maintain an equal distance from the surface of said plate.

6. The process as defined in claim 2, wherein sintering is carried out in an inert gas atmosphere.

7. The process as defined in claim 6, wherein said inert gas is selected from the group consisting of $CO_2$, nitrogen and hydrogen.

References Cited in the file of this patent

UNITED STATES PATENTS

| | | |
|---|---|---|
| 2,736,925 | Heisler | Mar. 6, 1956 |
| 2,745,141 | Brennan | May 15, 1956 |